G. BINDER.
ROTARY WASHING MACHINE.
APPLICATION FILED MAR. 31, 1920.

1,389,182.

Patented Aug. 30, 1921.
2 SHEETS—SHEET 1.

WITNESS:
Rob. R. Kitchel.

INVENTOR
Gottlob Binder
BY
Frank T. Brown
ATTORNEY.

UNITED STATES PATENT OFFICE.

GOTTLOB BINDER, OF PALMYRA, NEW JERSEY.

ROTARY WASHING-MACHINE.

1,389,182.  Specification of Letters Patent.  Patented Aug. 30, 1921.

Application filed March 31, 1920. Serial No. 370,094.

*To all whom it may concern:*

Be it known that I, GOTTLOB BINDER, a citizen of the United States, residing at Palmyra, county of Burlington, and State of New Jersey, have invented a new and useful Improvement in Rotary Washing-Machines, of which the following is a full, clear, and exact description, reference being had to the accompanying drawings, which form a part of this specification.

My invention relates to washing machines of the rotary drum type and has for its object to increase the efficiency and speed of operation of the washer.

Washing machines of this character are especially adapted to the washing of a variety of articles, including wearing apparel and household fabrics, that are cleaned in public service steam laundries.

My invention comprises a cylinder containing radially extending members of such width, so formed and shaped as to elevate the goods to a maximum height and at the same time submit them to a rubbing and scrubbing action analogous to that obtained in the use of the long familiar household washboard.

A preferred embodiment of my invention is shown in the accompanying drawings, wherein—

The washer comprises, as usual, an outer tub $a$, an inner cylinder $b$, a driven gear $c$ on the shaft of the cylinder, and a drain pipe $d$ connected underneath with the space between the tub and the cylinder.

The cylinder is provided with perforations $e$. Extending longitudinally of the cylinder and projecting inwardly from its inner walls are a plurality of wooden ribs $f$.

Secured to each base rib $f$ is a hollow corrugated supplemental rib $g$. This rib comprises a plate bent into a form that is oval in cross-section and applied to the rib $f$ so as to inclose, and project substantially beyond, the free inner end of the rib $f$.

Figure 1:
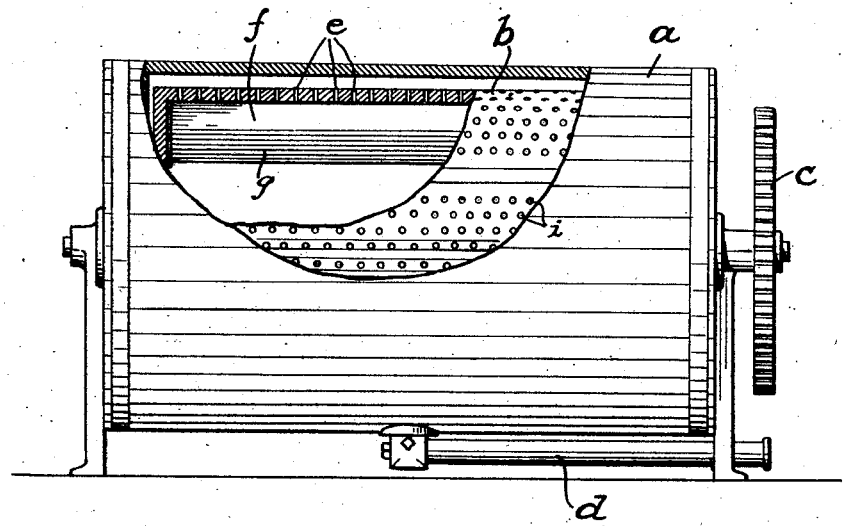
Figure 1 is a side elevation, partly broken away, of a complete washer.
Figure 2:
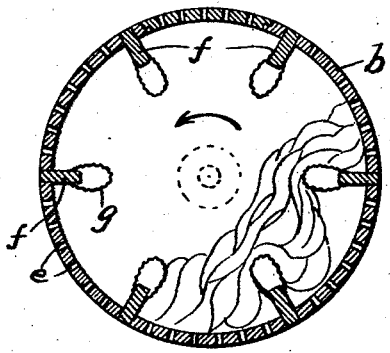
Fig. 2 is a cross-section through the cylinder.
Figure 3:
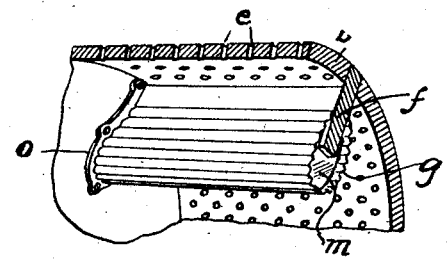
Fig. 3 is a detail perspective view of a part of the cylinder wall and one of the scrubbing ribs.
Figure 4:
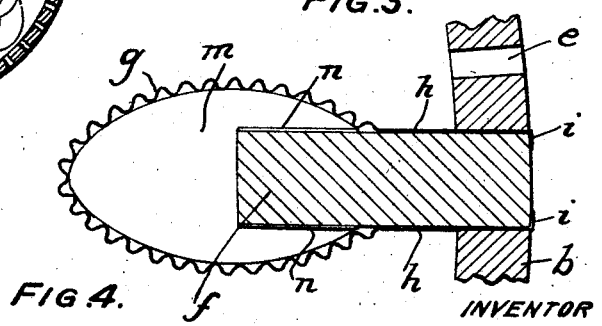
Fig. 4 is an enlarged side view, partly in section, of one of the scrubbing ribs.

In constructing a rib $g$, I prefer to take a sheet of thin flexible metal, such as brass or any other rust-resisting material, and corrugate the same longitudinally throughout a large part of its width, the parts near opposite side edges being uncorrugated. The corrugated sheet is then bent upon itself as shown in Fig. 4. The uncorrugated parts $h$ of the sheet adjacent the edges extend parallel to each other at $i$, while the corrugated part of the sheet swells outward away from the parts $h$, and then inwardly toward each other and meet at the center of the rib. Within the oval shaped inclosure formed by so bending the corrugated sheet are a plurality of reinforcing webs $m$. These webs are shaped to conform to the shape of said inclosure, being cut away to fit the outer portion of the wooden rib $f$, and preferably also flanged along the edges $n$, $n$. The reinforcing webs are secured within the hollow corrugated ribs by soldering or otherwise. The sheet metal structure described is thus adapted to fit over and engage one of the wooden ribs $f$, as shown in Fig. 4, and may be retained in place without any securing means. If desired, the ends of the rib $g$ may be confined within marginal strips $o$ secured to opposite end walls of the cylinder.

The structure described exhibits certain pronounced advantages. The space at one side of each compound rib $f$ $g$ and adjacent the inner wall of the cylinder forms a pocket which retains the goods to be washed until the rib, in its rotation, approaches the level of the top of the cylinder, say to within forty-five degrees of the top, thereby dropping the goods from a maximum height; and hence securing the most effective tumbling action and the greatest amount of friction between different surfaces of the goods. As the goods slide back and forth over the corrugated surfaces of the ribs $g$, they are subjected to a rubbing or scrubbing operation similar to that produced by rubbing the goods over a flat washboard, as in hand washing. The pressure of the rubbing or scrubbing action is increased by reason of the convexity of the surface of the corrugated rib.

While in ordinary rotary drum washers, it is often found necessary to examine the goods carefully after they are removed from the washer and subject parts of the goods not thoroughly cleansed to a special hand scrubbing operation, a washer constructed in accordance with my invention will subject every part of the surface of the goods to a scrubbing action and eliminate the necessity for subsequent careful inspection and supplemental washing. A still more important advantage is that it expedites the washing process about fifty per cent., thereby saving time with a corresponding increase in the capacity of the machine.

It will be understood that the specific construction above described is not an essential feature of my invention. I prefer such construction largely because thereby I can apply my invention to a washer of the most used type without reconstructing the latter. Other specific constructions, within the skill of the mechanic, may be preferred in the manufacture of entirely new washers. Again, while I prefer to employ a perforated cylinder and solid ribs, the invention is not limited to these features. Any convenient means for allowing a flow of water, suitably distributed, between the inside and outside of the cylinder, may be adopted.

The projections are of convex form, from their inner ends to a point between the ends, so that the clothes will be subjected to a scrubbing action by all of the corrugations on the one face each of the projection.

On the second sheet of drawings, I have illustrated several of a number of permissible modifications of my invention.

Figure 5:
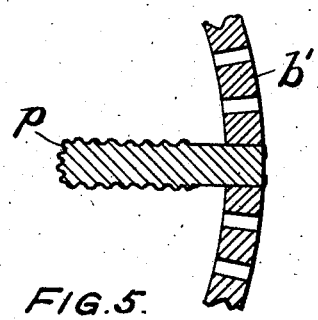
Figs. 5, 6, 7, 9 and 10 are enlarged sectional views of modifications, each showing a rib embodying my invention, and a small part of the periphery of the cylinder.

In Fig. 5, the specially made corrugated rib $p$ is secured direct to the cylinder $b'$ and is solid with parallel sides. It may be made out of metal, but if solid it would preferably be made out of wood.

Figure 6:
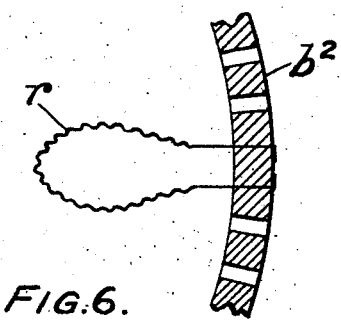

In Fig. 6, the corrugated rib $r$ secured to the cylinder $b^2$ has the external conformation of the compound rib shown in Fig. 4, but is made in one piece. If made hollow, as shown, it would preferably be made out of metal.

Figure 7:
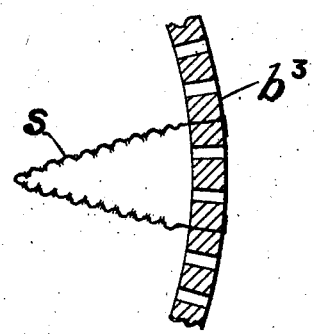
Figure 8:
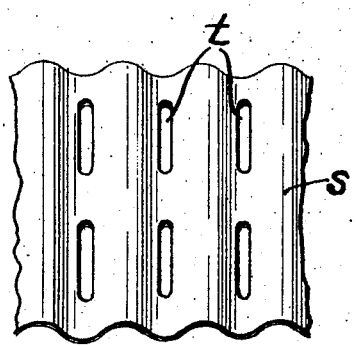
Fig. 8 is an enlarged perspective view of a portion of a hollow corrugated perforated rib.

In Fig. 7, the corrugated rib $s$ secured to the cylinder $b^3$ is of triangular shape in cross-section and is hollow and provided with perforations $t$, as shown in Fig. 8, to allow the passage of water therethrough.

Figure 9:
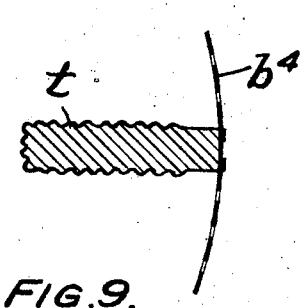
Figure 10:
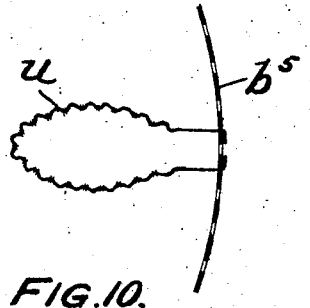

The cylinders are shown in the preceding figures as of substantial thickness and are intended to be made out of wood. The cylinder may be made relatively thin and out of metal, as shown at $b^4$ and $b^5$, Figs. 9 and 10. The rib may be made solid, as shown at $t$ in Fig. 9, or hollow and perforated as shown at $u$ in Fig. 10.

While I have referred to the cylinder as "rotatable," it will be understood that I meant to comprehend by this term a cylinder which is oscillatable on its axis; my invention being applicable, for example, not only to large washing machines used in public service steam laundries, but also to electrically operated household washing machines of either the rotary or oscillatable type.

Having now fully described my invention, what I claim and desire to protect by Letters Patent is:—

1. A washing machine comprising a cylinder, a plurality of longitudinal ribs extending in a radial direction from the inner face of the cylinder, said ribs being of general oval form, the diameter of said ribs being greater between the ends than at the ends and having longitudinal corrugations arranged to be engaged by articles being washed, the inner face of the cylinder between the ribs being of concave form.

2. In a washing machine, the combination with a rotatable cylinder, of a base rib projecting inward from the wall of the cylinder, a corrugated plate bent to form a hollow supplemental rib inclosing and extending beyond the free inner end of the base rib, and a reinforcing web within the hollow supplemental rib and cut away to fit the inner free end of the base rib.

In testimony of which invention, I have hereunto set my hand, at Philadelphia, Penna., on this 30th day of March, 1920.

GOTTLOB BINDER.